Aug. 4, 1936.  C. W. JOHNSON  2,050,096
SAFETY ATTACHMENT FOR OIL TANKS
Filed Dec. 22, 1934 2 Sheets-Sheet 1
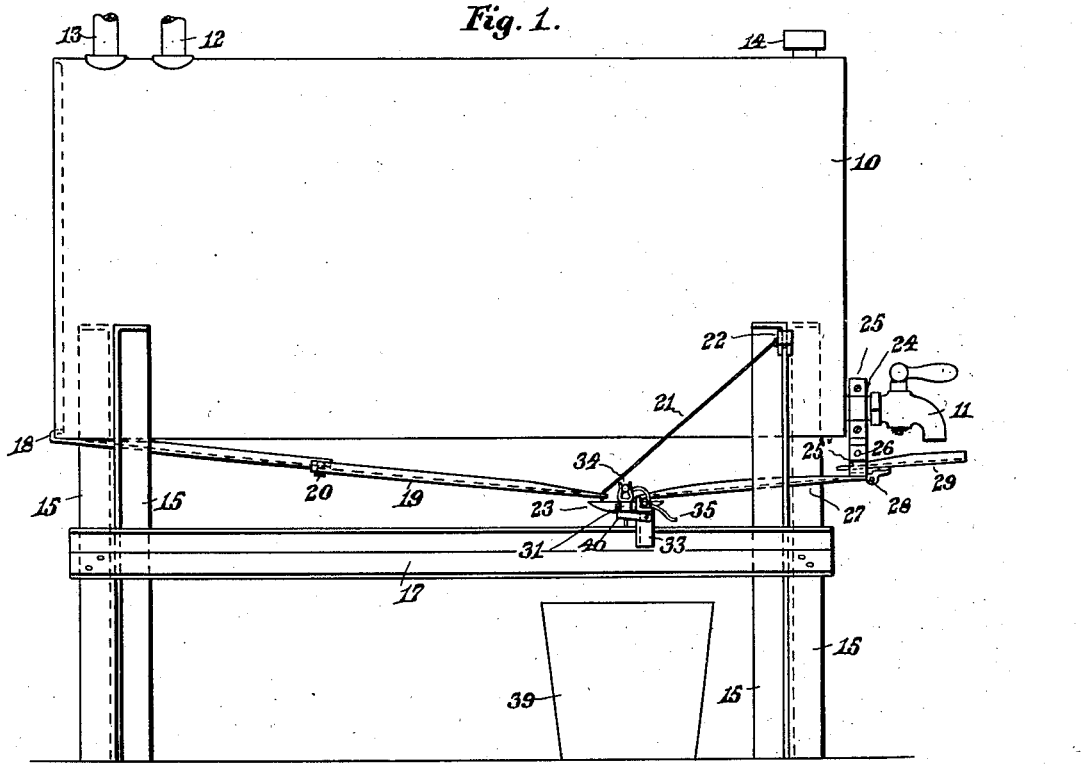
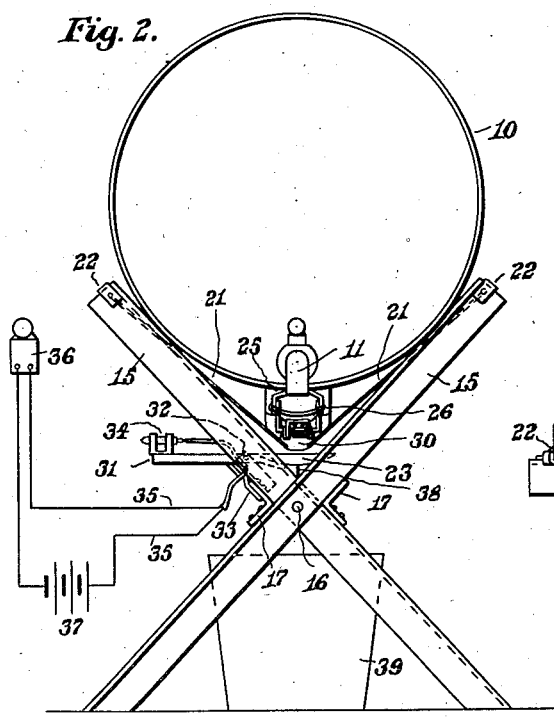
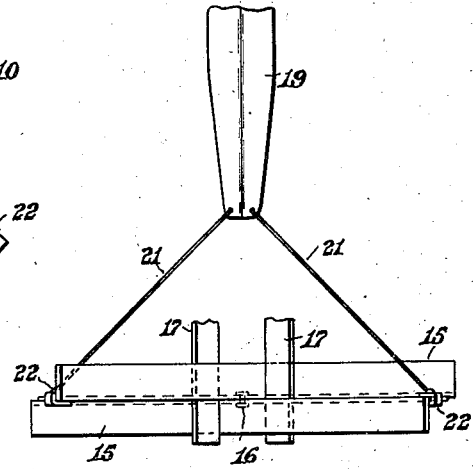
Inventor:
Chester W. Johnson,
by Walter E. Lombard.
Atty.

Aug. 4, 1936.  C. W. JOHNSON  2,050,096
SAFETY ATTACHMENT FOR OIL TANKS
Filed Dec. 22, 1934  2 Sheets—Sheet 2
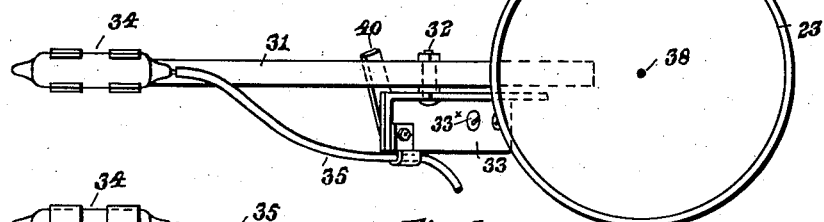
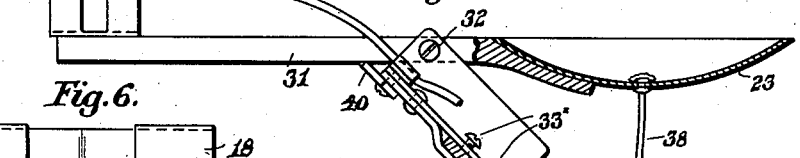
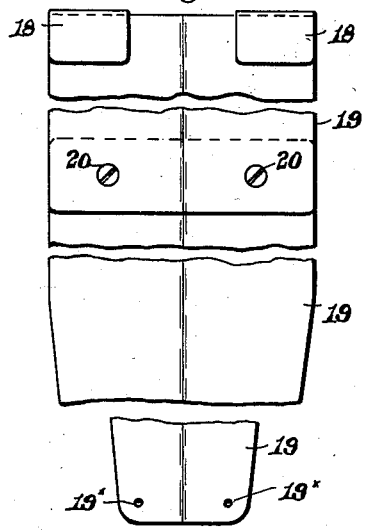
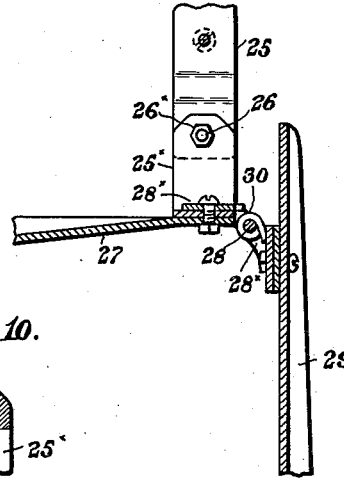
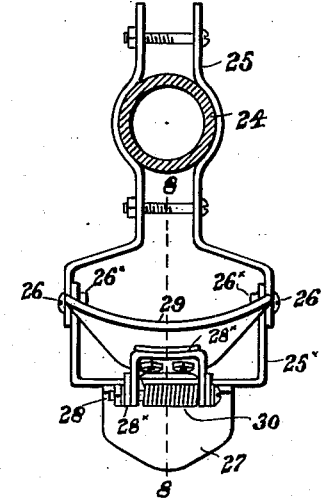
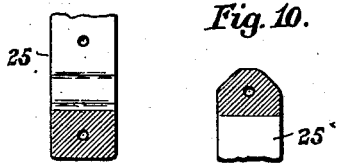
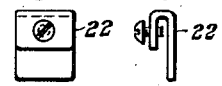
Inventor:
Chester W. Johnson,
by Walter E. Lombard,
Atty.

Patented Aug. 4, 1936

2,050,096

UNITED STATES PATENT OFFICE 2,050,096

SAFETY ATTACHMENT FOR OIL TANKS

Chester W. Johnson, Weymouth, Mass., assignor to James Kinniburgh, Quincy, Mass.

Application December 22, 1934, Serial No. 758,734

7 Claims. (Cl. 221—69)

This invention relates to safety devices for tanks containing liquids of an inflammable nature, such for instance as kerosene, and has for its object the provision of means for collecting in a suitable receptacle any oil dripping from the discharge faucet or leaking from the tank itself.

It is particularly adapted for use in connection with kerosene storage tanks in houses provided with range oil burners, and when used prevents the oil from dripping onto the floor where owing to its inflammable nature it becomes a fire hazard.

One object of the invention is the provision of means for taking care automatically of any normal amount of oil dripping from the faucet or leaking from the tank, while a further object is the provision of an alarm which will be operated automatically when an excessive amount of oil drips or leaks from the tank.

These objects are attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Figure 1 represents a side elevation of a supported oil supply tank having attached thereto a safety device embodying the principles of the present invention.

Figure 2 represents an end elevation of the same.

Figure 3 represents a plan of one of the end supports for the tank and showing a means for supporting one end of an inclined trough beneath the tank.

Figure 4 represents a plan of the receiving bucket and the support therefor.

Figure 5 represents a side elevation of the same, the bucket being shown in section.

Figure 6 represents a plan of the rear inclined trough.

Figure 7 represents a vertical section through the discharge pipe and showing the front trough supporting devices.

Figure 8 represents a vertical section of line 8, 8 on Fig. 7 and showing the front trough extension moved into vertical position.

Figure 9 represents an elevation of one of the lower ends of the upper part of the trough supporting stirrup.

Figure 10 represents an elevation of one end of the lower part of said stirrup.

Figure 11 represents an elevation of one of the clips for supporting the rear trough, and Figure 12 represents a side elevation of the same.

Similar characters indicate like parts throughout the several figures of the drawings.

In the drawings, 10 is an oil tank provided at its forward end with a discharge faucet 11.

In the upper part of the tank 10 is a vent pipe 12, a filling pipe 13 and another tank opening 14 into which may be inserted a gauge to determine the amount of oil in the tank.

This tank is of usual construction and is mounted on a support consisting of two angle irons 15 pivoted together at 16 and disposed at the opposite ends of the tank 10.

These angle irons 15 are connected together by horizontal angle irons 17 which limit the movement of the angle irons 15 about the pivot 16.

The support as described is of usual construction.

Hooked to the rear end of the tank 10, as shown at 18 in Fig. 1 of the drawings, is a trough 19 preferably made in two parts secured together at 20 and inclined downwardly toward the front end of tank 10.

The only object in making the trough 19 in two parts is to save space in shipping.

The forward end of the trough 19 has openings 19x therein in which are secured wires 21 having at their upper ends U-shaped clips 22 hooked over the upper ends of the angle irons 15.

Disposed beneath the lower end of the trough 19 is a bucket 23 adapted to receive any oil which might possibly leak from the tank and run down said inclined trough 19.

Clamped to the discharge pipe 24 behind the faucet 11 is a stirrup made in two parts 25, 25x pivoted together at 26.

The contacting faces of the parts 25, 25x are serrated as shown in Figs. 9 and 10 to retain them in adjusted position when clamped together by the pivot members 26 which are provided with clamp nuts 26x.

Secured to the lower part of the stirrup 25 is the front end of an inclined trough 27, the lower rear end of which extends over the bucket 23.

Both of the troughs 19 and 27 are beneath the center of the tank 10.

Pivoted at 28 to the forward end of the trough 27 is an inclined trough extension 29, the rear end of which is disposed over the upper forward end of the trough 27.

This extension 29 is immediately below the faucet 11 and under normal conditions is retained in this position by means of a spring 30 surrounding the pivot pin 28.

The pin 28 connects two members 28x, one of which is secured to the under face of extension 29 while the other is secured to the lower stirrup part 25x.

The bucket 23 is secured to one end of a bar 31 pivoted at 32 to a bifurcated support 33 straddling one flange of one of the horizontal angle irons 17.

When mounted on said flange it is clamped thereto by the screws 33x.

At the other end of the bar 31 is a mercury switch 34 having wires 35 leading therefrom and forming an electric circuit with a bell 36 and a battery 37.

The bucket 23 is saucer-shaped and has a central opening therein in which is disposed a wick 38.

When the safety mechanism is attached to the tank 10 and discharge pipe 24, a pail 39 is disposed beneath the bucket 23.

On the bifurcated support 33 and coacting with the bar 31 is a pivoted finger 40 adapted to be moved about its pivot to retain the bar 31 horizontal under normal conditions.

Under normal conditions the bar 31 is so balanced that it will rest upon this finger 40 and maintain its horizontal position until an excessive amount of oil is deposited in the bucket 23.

Under normal conditions any dripping of oil from the faucet 11 and flowing down the extension 29 and trough 27, or leakage from the tank 10 flowing down the inclined trough 19, will pass through the wick 38 and drop into the pail or other receptacle 39.

When there is an excessive amount of oil deposited in the bucket 23, the increased weight will move the bucket 23 downwardly tilting the bar 31 and causing the mercury switch 34 to close the electric circuit 35 and operate the bell alarm 36.

When the bell alarm 36 is sounded a notification will be given that an abnormal condition exists in the safety attachment and that it is necessary to tilt the bar 31 so that the excessive amount of oil in the bucket 23 will be spilled into the receptacle 39.

The mercury switch 34, bell alarm 36 and the electric circuit 35 connecting the same, may be of any well known construction.

This mechanism is particularly adapted for use in connection with tanks in which is stored an extra supply of kerosene for range oil burners.

When it is desired to fill the bottle forming a part of the range oil burner, the trough extension 29 is moved about its pivot 28 into a vertical position as shown in Fig. 8, permitting the neck of the bottle being disposed immediately beneath the faucet 11.

When the faucet 11 is opened, the bottle may be filled and the faucet closed.

As soon as the bottle is removed from beneath the faucet 11, the spring 30 acting upon the extension 29 will return it to its normal position, as indicated in Fig. 1.

When in this position, if there are any drippings from the faucet, the oil deposited on the extension 29 will flow down the same and down the trough 27 into the bucket 23.

If the bottle is removed from beneath the faucet 11 before closing the same, the excessive flow of oil into the bucket 23 will operate the switch 24 and sound an alarm on bell 36.

By means of this mechanism attached to an oil supply tank, all leakage from the tank and drippings from the faucet 11 will be prevented from dropping onto the floor of the room in which the tank 10 is positioned.

This is of great importance because without some such safety device as herein described, the oil is liable to leak from the tank under abnormal conditions and drip from the faucet 11 onto the floor and cause a fire hazard.

The inclination of the trough 27 may be varied by adjusting the lower part 25x of the stirrup about the pivot 26 relatively to the upper part 25 of said stirrup.

While the attachment is designed primarily for use in connection with tanks containing kerosene, it is obvious that it may be used to advantage in connection with any tanks containing liquid.

The oil or other liquid deposited in pail 39 may be saved by pouring it into the tank 10 through the pipe 13.

It is believed that the operation and many advantages of the invention will be understood without further description.

Having thus described my invention, I claim

1. In combination with an oil tank and a discharge faucet therefor; an inclined two-part trough beneath said tank and supported therefrom, the two parts being normally in the same vertical plane with the highest part extending normally beneath said faucet and movable relatively to the lower part, as desired, from the path of the discharge from said faucet.

2. In combination with an oil tank and a discharge faucet therefor; an inclined two-part trough beneath said tank and supported therefrom with its highest part normally positioned beneath said faucet, said trough parts being in the same vertical plane; a pivotal connection between the two parts of the trough permitting the highest part being moved relatively to the lower part and from beneath the faucet; and a spring for returning said highest part to its normal position.

3. In combination with an oil tank and a discharge faucet therefor; an inclined two-part trough beneath said tank and supported therefrom with its highest part normally positioned beneath said faucet, said trough parts being in the same vertical plane; a pivotal connection between the two parts of the trough permitting the highest part being moved downwardly relatively to the lower part and from beneath the faucet; and a spring for returning said highest part to its normal position.

4. In combination with an oil tank and a discharge faucet therefor; an inclined two-part trough beneath said tank with its highest part normally positioned beneath said faucet, said trough parts being in the same vertical plane; a pivotal connection between the two parts of the trough permitting the highest part being moved downwardly relatively to the lower part and from beneath the faucet; a spring for returning said highest part to its normal position; and a stirrup clamped to said faucet and to the lower end of which the forward end of the lowest trough part is secured rigidly.

5. In combination with an oil tank and a discharge faucet therefor; a stirrup clamped to said faucet, an inclined trough secured at its forward end to said stirrup and extending rearwardly beneath the tank; an inclined extension to said trough pivotally connected to the forward end of said trough and normally positioned beneath the faucet and in the same plane with said trough, said extension being movable downwardly about its pivot into a vertical position; and a spring for returning said extension to its normal position.

6. In combination with an oil tank and a discharge faucet therefor; an inclined two-part trough beneath and supported from said tank with its highest part normally positioned beneath said faucet; a pivotal connection between the two parts of the trough permitting the highest part being moved downwardly from beneath the faucet; a spring for returning said highest part to its normal position; and a two-part stirrup clamped to said faucet and to which the forward end of the lowest trough part is secured, the lower part of said stirrup being pivotally connected to the upper part and clamped thereto.

7. In combination with an oil tank and a discharge faucet therefor; a support secured to and depending from said faucet, said support being formed of two parts adapted to be clamped together in adjusted position relatively to each other; an inclined trough secured at its highest end to the lower part of said support and extending rearwardly beneath said tank; a hinge secured to the lower part of said support with its pivot in front of said inclined trough; an inclined trough extension secured to said hinge; and a spring associated with said hinge for normally retaining said trough extension with its rear lower end projecting over the forward end of the main trough.

CHESTER W. JOHNSON.